United States Patent
Levin et al.

(10) Patent No.: US 6,625,777 B1
(45) Date of Patent: Sep. 23, 2003

(54) METHOD OF IDENTIFYING AN IMPROVED CONFIGURATION FOR A COMMUNICATION SYSTEM USING CODING GAIN AND AN APPARATUS THEREFOR

(75) Inventors: Howard Earl Levin, Champaign, IL (US); James J. Kosmach, Austin, TX (US); Jaksa Djordjevic, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/420,471

(22) Filed: Oct. 19, 1999

(51) Int. Cl.$^7$ .......................... H03M 13/00; H04L 1/18
(52) U.S. Cl. ....................................... 714/774; 714/751
(58) Field of Search .................................. 714/774, 751

(56) References Cited

U.S. PATENT DOCUMENTS

| | | | | |
|---|---|---|---|---|
| 5,299,070 A | * | 3/1994 | Takahashi et al. ........... | 386/104 |
| 5,546,411 A | * | 8/1996 | Leitch et al. ................ | 714/708 |
| 5,600,663 A | * | 2/1997 | Ayanoglu et al. ............ | 714/774 |
| 5,699,365 A | | 12/1997 | Klayman et al. ........... | 714/708 |
| 5,699,369 A | * | 12/1997 | Guha .......................... | 714/774 |
| 5,828,677 A | * | 10/1998 | Sayeed et al. .............. | 714/774 |
| 5,852,633 A | | 12/1998 | Levin .......................... | 375/260 |
| 5,926,232 A | * | 7/1999 | Mangold et al. ........ | 375/240.27 |
| 6,044,485 A | * | 3/2000 | Dent et al. .................. | 714/774 |
| 6,182,264 B1 | * | 1/2001 | Ott .............................. | 714/774 |
| 6,370,669 B1 | * | 4/2002 | Eroz et al. .................. | 714/774 |

OTHER PUBLICATIONS

Naijoh, M.; Sampei, S.; Morinaga, N. and Kamio, Y.; ARQ schemes with adaptive modulation/TDMA/TDD systems for wireless multimedia communication services; The 8th IEEE International Symposium on Personal, Indoor and Mobile Radio Communications, 1997 PIMRC '.*

Bakhtiyari, S.; Kallel, S. and Leung, V.; A robust type II hybrid ARQ scheme with code combining for mobile communications; IEEE Pacific Rim Conference on Communications, Computers and Signal Processing, 1993, vol.: 1, pp.: 214–217, vol. 1.*

Thomas Starr et al., "Understanding Digital Subscriber Line Technology", Communication Engineering and Emerging Technologies, 2 pgs.

John M. Cioffi, "A Multicarrier Primer", Amati Communications Corp. and Stanford University, pp. 1–18.

T. N. Zogakis et al., "Performance Comparison of FEC/Interleave Choices with DMT for ADSL", Project TIE1.4/93–091, pp. 1–9.

Danny Van Bruyssel, "Performance Calculations for ADSL DMT systems in Spectrum Management Project", Standard Project TIE1.4: Spectral Management, pp. 1–5.

SC90604A, Howard Earl Levin, Ser. No. 08/937,759, filed Sep. 25, 1997, "Method and Apparatus for Configuring a Communication System", pending.

* cited by examiner

*Primary Examiner*—Albert Decady
*Assistant Examiner*—Joseph D. Torres
(74) *Attorney, Agent, or Firm*—James L. Clingan, Jr.; Michael P. Noonan

(57) ABSTRACT

Coding gain is used to configure a communication system using a programmable error correction scheme. A best available error correction configuration is selected from among several configurations to provide an optimal coding gain performance for a given line or set of line characteristics and a given communication system. Payload is calculated for each of several error correction configurations, and the configuration providing the highest payload for a target bit error rate is selected. Use of gross gain to configure the communication system further provides an optimal configuration.

17 Claims, 9 Drawing Sheets

METHOD OF IDENTIFYING AN IMPROVED CONFIGURATION FOR A COMMUNICATION SYSTEM USING CODING GAIN AND AN APPARATUS THEREFOR

BACKGROUND

1. Field of the Invention

The present invention relates to communication systems, and, more particularly, to digital subscriber lines using error correction.

2. Description of the Related Art

Digital subscriber line (DSL) technology dramatically increases the digital capacity of ordinary, local-loop telephone lines. Although DSL technologies are still emerging, there are a multitude of versions of DSL transmission technology. DSL allows for normal voice use of the "plain old telephone services" (POTS) coupled with concurrent high-speed data transmission over the same lines. DSL data can share the same line as typical voice telephone communications, because the data uses higher frequencies than the voice band.

One DSL technology is Asymmetrical DSL (ADSL). ADSL is available in two modulation schemes: discrete multitone (DMT) or carrierless amplitude phase (CAP). ADSL DMT systems are often referred to as multicarrier systems because DMT uses many narrow-band carriers, all transmitting simultaneously in parallel.

ADSL systems using DMT split the available bandwidth into a number of discrete subchannels, also called bands or bins. Each subchannel carries a portion of the total information being transmitted. The many subchannels are independently modulated with a carrier frequency corresponding to the center frequency of the subchannel and are processed in parallel. DMT can allocate data so that the throughput of every single subchannel is maximized. For example, DMT can maximize channel throughput by sending different numbers of bits on different subchannels. The number of bits on each subchannel depends on the Signal-to-Noise Ratio (SNR) of each subchannel. If a subchannel can not carry any data, it can be turned off, and the use of available bandwidth is optimized.

ADSL can be seen as a frequency-division multiplexed (FDM) system in which the available bandwidth of a single copper loop is divided into three parts: POTS voice band, upstream data channels and downstream data channels. In ADSL DMT-systems, the downstream channels are typically divided into 256 4-kHz-wide subchannels, and the upstream channels are typically divided into 32 subchannels. A baseband can be occupied by the POTS voice service.

In addition to choosing a robust modulation technique, the performance of a DMT system can be further increased by using error-control coding techniques. Error-control coding techniques can increase data capacity and protect against noise and interference. By adding redundancy it is possible to increase the efficiency of a communication channel. Different coding techniques have different benefits such as improved performance for the same signal power (or keeping the same performance at lower power), improving the ability to cope with noise, maximizing throughput, or ensuring a consistent quality of service.

Error correction characterization typically takes place in systems employing some or all of: fixed rate transfers, fixed error correction schemes, single carrier transmission, and adjustable sample rates. The characteristics of such systems allow one to predict the costs and gains of coding schemes. Traditional coding gain techniques exist for single carrier systems that increase transmission bandwidth to account for redundancy (overhead) bits (e.g., Reed-Solomon coding). Bandwidth efficient schemes such as Trellis coding that increase constellation size instead of speeding up the transmission rate also exist. Such techniques typically assume a fixed energy/bit (which yields a predictable coding cost), variable transmission bandwidth and fixed error-control coding parameters. For these types of systems, it is possible to predict the net coding gain, which is the net effect of the overhead bits (cost) and performance improvement (gain). Since most systems have fixed coding schemes the net gain is known a priori.

But for a multirate system which adapts to variable line conditions with a fixed sample rate, the coding gains and costs are different for each line. In fact, with a multirate, multicarrier system such as ADSL, there has been no known method for predicting the gains and costs of employing error correction. Specifically, it has not been known how to accurately predict the cost of overhead bits in a multicarrier system. Capacity or system performance estimation (measured with margin) based on net gain has therefore been inaccurate. Furthermore, the error correction schemes implemented in a system such as ADSL are programmable and can be configured to yield different coding gains. A poor error correction configuration can hurt system performance, and reduce the amount of user payload capacity.

There is a need for a method and apparatus that allows one to determine which configuration (e.g., coding or error correction configuration) provides an optimal coding gain performance for any given line or set of line characteristics including variable energy/bit, fixed bandwidth, and variable error-control coding parameters. Specifically, for implementation of an ADSL system, there is a need for a method to select the best system configuration based on multicarrier SNR values and the different coding gains related to varied parameters of the error correction schemes.

BRIEF DESCRIPTION OF THE DRAWINGS

At least one illustrative embodiment is disclosed in the following text and the accompanying drawings.

DETAILED DESCRIPTION

Figure 1:
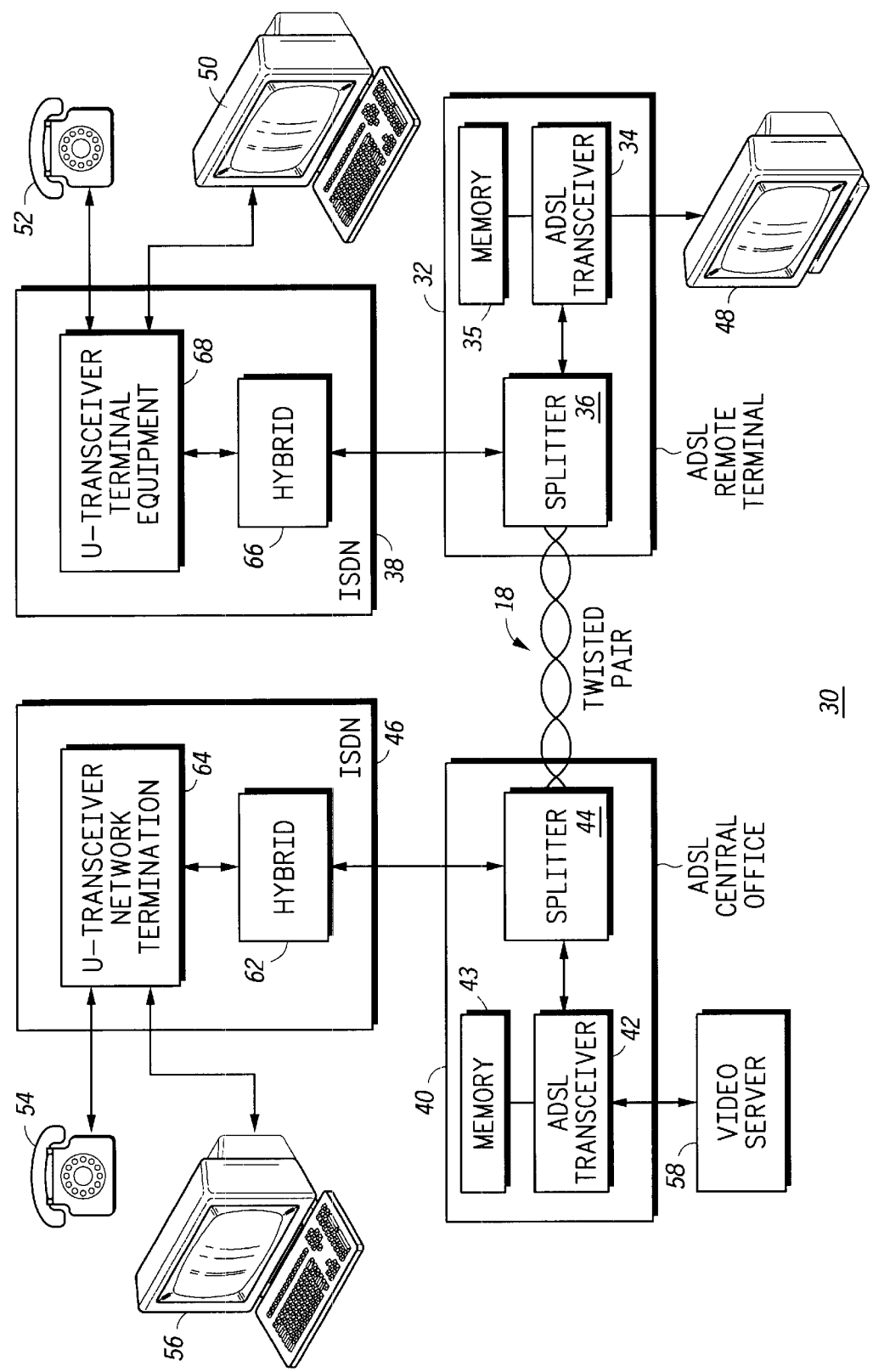
FIG. 1 illustrates, in block diagram form, a data processing system.

The following is intended to provide a detailed description of at least one example of the invention and should not be taken to be limiting of the invention itself. Rather, any number of variations may fall within the scope of the invention which is defined in the claims following the description.

Based on the teachings herein, in a system using a programmable error correction scheme, an improved error correction configuration is selected through calculation and use of gross gain. A configuration is selected from among several configurations to provide an optimal coding gain performance for a given line or set of line characteristics including variable energy/bit, fixed bandwidth, and variable error-control coding parameters and for a given system. The best system configuration is selected based on multicarrier SNR values and the different coding gains related to varied parameters of the error correction schemes.

Error correction schemes can be understood with the following equation:

$$\text{Net Gain} = \text{Gross Gain} - \text{Cost}$$

The Gross Gain is the raw benefit from the coding scheme. The Cost is the loss of resources which were required to implement the coding scheme. The Net Gain is the overall system performance increase from employing a coding scheme. The elements of the equation can be expressed in terms of bits or dB. For example, a simple system has a user payload capacity of 20 bits for a given bit error rate (BER). A coding scheme increases the capacity to 30 bits, but in order to implement the coding scheme, 6 bits of redundancy are required which can not be used for user payload data. In this case, Gross Gain is 10 bits, Cost is 6 bits, and Net Gain is 4 bits. The Cost can be referred to as overhead.

Based on the teachings herein, improved error correction results are obtained by using gross gain to calculate capacity instead of net gain. Gross Gain is predictable and is dependent on the coding scheme. The cost is dependent on the channel characteristics. Because one cannot accurately predict the cost of overhead bits in a multicarrier system, capacity (in bits) or system performance estimation (using SNR margin) based on net gain is therefore inaccurate. Selecting a coding configuration based on predicted gross gain is more accurate than selecting a coding configuration based on estimated net gain. Thus, based on the teachings herein, the need to account for cost up front is avoided. Although it is possible to calculate the net gain and cost after selecting the configuration, the net gain and cost are not required for selecting the configuration. The multicarrier system configuration selection described herein improves channel performance while dealing with channel characteristics such as variable energy/bit, fixed bandwidth, and variable RS parameters.

In one embodiment, a standard compliant ADSL system has the ability to transmit data using four error correction configurations: 1) no error correction, 2) Trellis code error correction only, 3) Reed Solomon error correction only, or 4) concatenated coding (e.g., simultaneous Trellis and Reed Solomon error correction). The goal is to maximize payload capacity by generating the capacity for each of the four configurations listed above and selecting the configuration with the highest payload. When Reed-Solomon (RS) coding is used, it is necessary to select the best RS parameters. After the payload is calculated for each of the four configurations, the configuration providing the highest payload is selected.

Due to the many system variables including transmission medium length and frequency dependent noise disturber levels, not one of the four error correction configurations is always best. Additionally, prior to the teachings herein, there has been no known method to determine whether selected Reed-Solomon parameters optimize the system or to determine whether it is advantageous to use Trellis coding in the system. The optimal or best available coding configuration is selected based on communication channel characteristics which are measured and/or derived through the use of training sequences and different coding configurations. The selection is done during modem initialization prior to data transmission which uses the selected coding configuration. An optimal or best available configuration is selected in at least one embodiment set forth herein. An optimal configuration is one that is capable of sending the maximum amount of user payload at a target BER. The best configuration available is selected from a group of configuration options which may or may not include the optimal configuration. The configuration options include, for example, parameters that are not limited to user payload requirements, redundancy requirements, codeword size, use of Trellis coding, desired coding gain, etc. The configuration options can be ranked in preferential order.

Referring to FIG. 1, an exemplary communication system such as system 30 is disclosed. System 30 includes a first ISDN terminal 46 and a second ISDN terminal 38. The first ISDN terminal 46 is connected to an ADSL central office 40 which is coupled to a video server 58. The ADSL central office 40 includes an ADSL transceiver 42 coupled to a splitter 44 and memory 43. The splitter 44 is coupled to a hybrid module 62 within the ISDN terminal 46 via an analog line. The ADSL central office 40 is in communication with an ADSL remote terminal 32 via twisted pair 18. The ADSL remote terminal 32 is coupled to the second ISDN terminal 38. The ADSL remote terminal 32 includes ADSL transceiver 34 coupled to splitter 36 and memory 35. The ADSL transceiver 34 is coupled to a user display 48, such as a television or computer monitor. Other embodiments do not include splitters 36 and 44. The first ISDN terminal 46 includes hybrid module 62 and a transceiver network termination node 64. The network termination node 64 may optionally be coupled to external peripheral devices such as phone 54 and user display/personal computer 56. Similarly, the second ISDN terminal 38 includes a hybrid module 66 and transceiver terminal equipment 68. The terminal equipment 68 may be coupled to external devices such as telephone 52 and computer/display 50.

The foregoing components and devices are used herein as examples for sake of conceptual clarity. Consequently, as used herein these specific exemplars are intended to be representative of their more general classes. Furthermore, in general, the use of any specific exemplar herein is also intended to be representative of its class and the noninclusion of any specific devices in any exemplary lists herein should not be taken as indicating that limitation is desired.

During operation, the ADSL central office can receive data such as video data from video server 58 via ADSL transceiver 42. The data from ADSL transceiver 42 may be communicated either to the ISDN network via ISDN terminal 46 or via twisted pair 18 to a second ADSL office, such as the ADSL remote terminal 32. For example, video data from video server 58 may be transceived by ADSL transceiver 42 and then communicated across twisted pair 18 through splitter 36 and then transceived by ADSL transceiver 34 for display on a remote terminal such as display unit 48. Alternatively, data from the ISDN network, such as ISDN terminals 38 and 46 may be transmitted across twisted pair 18 when appropriately connected via splitters 36 and 44.

While the system 30 disclosed in FIG. 1 describes a communication system including ISDN networks, the ADSL transceiver pairs 42 and 34 and accompanying splitters 44 and 36 may be connected to a number of different telephone or other communication systems for alternative data transfer systems. Such data transfer systems are often capable of voice band communication and data communication. Other embodiments will not include splitters 44 and 36.

Figure 2:
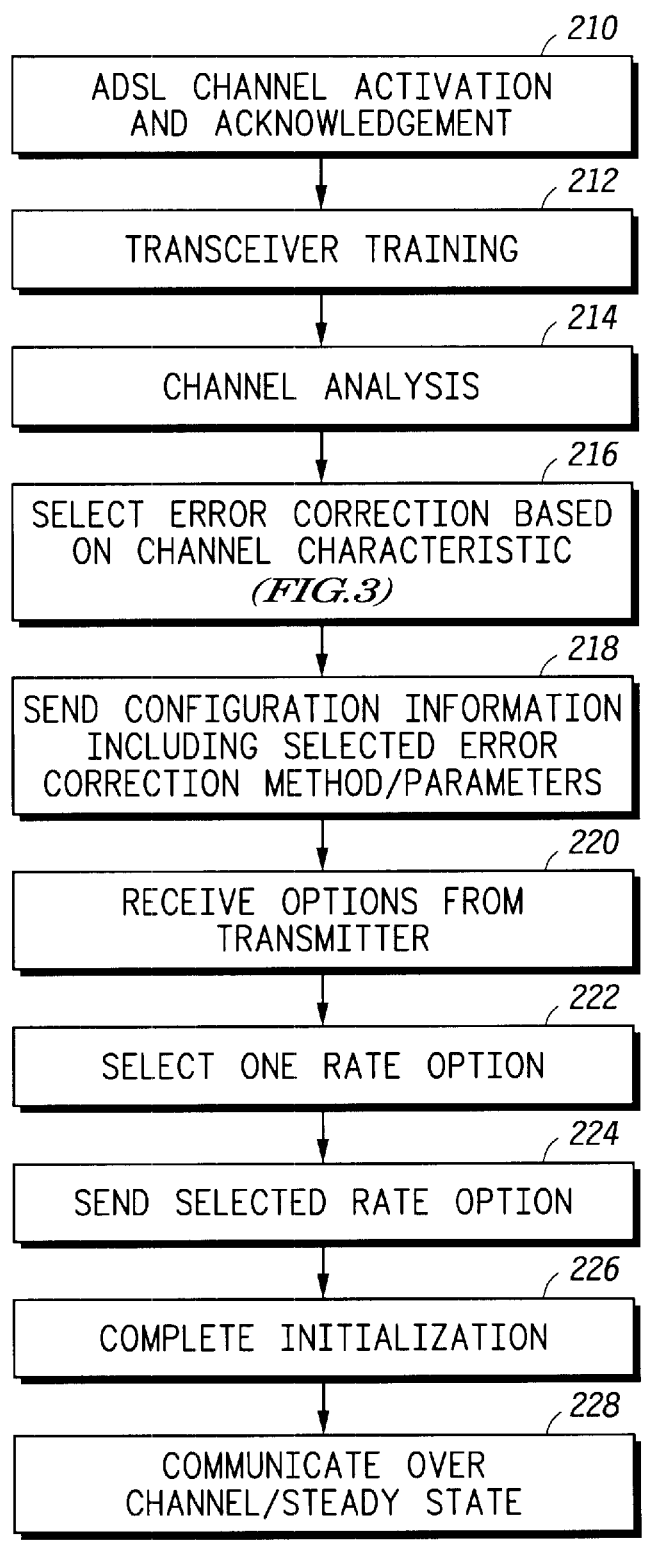
FIG. 2 illustrates in flow diagram form, a method of initializing an ADSL transceiver.

Referring to FIG. 2, a particular illustrative method of initializing an ADSL transceiver, such as either of ADSL transceivers 34 and 42 is disclosed. First, an ADSL channel over twisted pair 18 is activated and acknowledged at step 210. Next, the transceiver 34, for example, is trained based on measured characteristics of the channel, at step 212. Thereafter the channel is analyzed at step 214. The channel analysis produces signal-to-noise ratios (SNRs) for each frequency bin or subcarrier within the channel. In the described asymmetric DSL implementation, the number of frequency bins is 256 bins from the ADSL central office to the ADSL remote terminal 32, and 32 frequency bins in the reverse direction from the ADSL remote terminal 32 to the ADSL central office 40. After performing channel analysis, an appropriate error correction method and parameters are selected based on the particular channel characteristics, at step 216. A particular illustrative method of selecting error correction is further described hereinafter with reference to FIG. 3 et seq. At step 218, configuration information including the selected error correction method/parameters are sent by the remote transceiver 34 to the central office transceiver 42. Options, such as rate options are then received by transceiver 34 from the central office transmitter such as transceiver 42 at step 220. At step 222, one rate is selected (further discussed hereinafter with reference to FIG. 10) and the selected rate option is then transmitted to the appropriate paired transceiver (e.g., transceiver 42) at step 224. Initialization is then completed at step 226, and channel communication of user data then occurs during steady state, at step 228.

Figure 3:
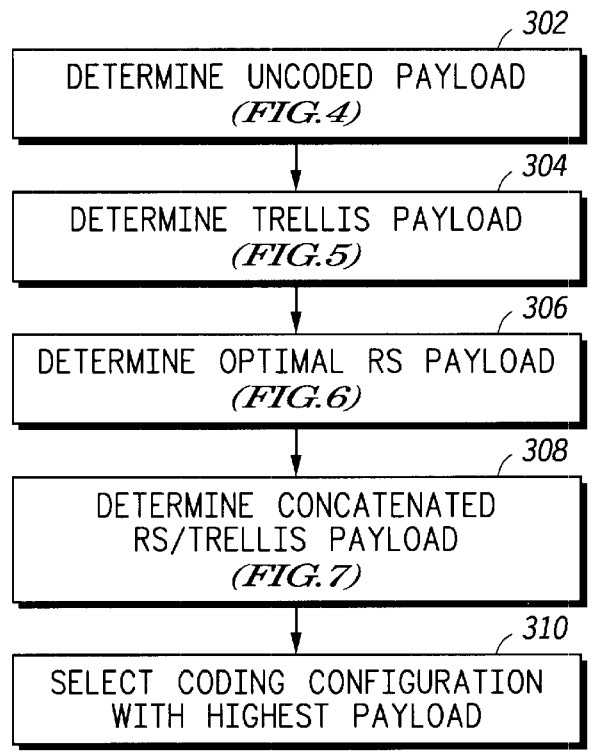
FIG. 3 illustrates, in flow diagram form, a method of selecting error correction for the specific ADSL transceiver pair.

Referring to FIG. 3, an illustrative method of selecting error correction for the specific ADSL transceiver pair is disclosed. In this illustrative method, the payload for channel transmissions without using any error correction or coding is first determined at step 302. At step 304, the available payload for the channel using Trellis coding is determined. At step 306, the available payload using Reed-Solomon coding is determined. At step 308, the available payload for concatenated Reed-Solomon/Trellis coding is determined. The respective payloads for steps 302–308 are then compared and the coding configuration with the highest payload is then selected at step 310.

Figure 4:
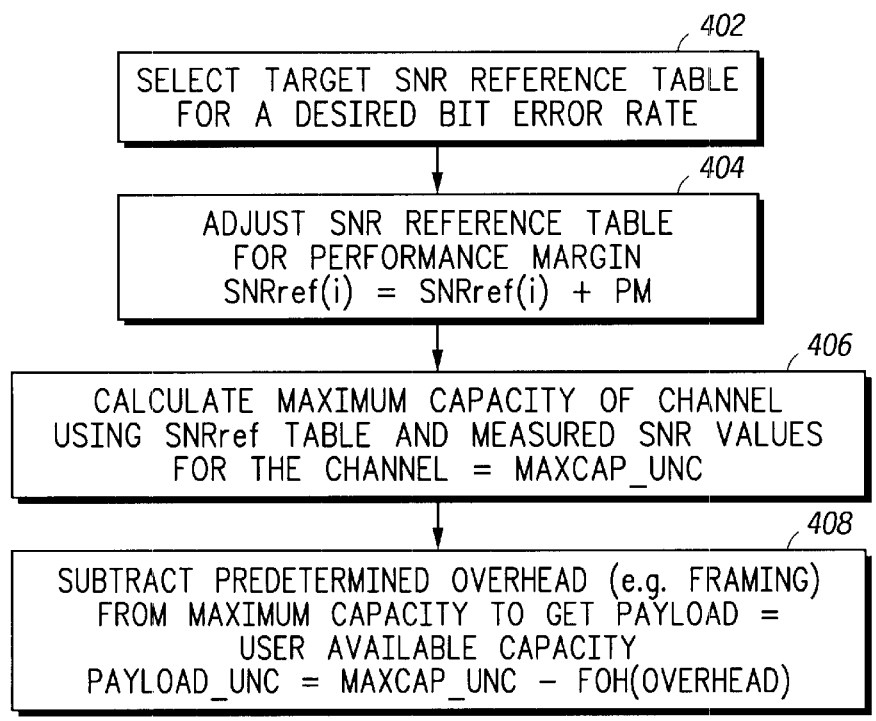
FIG. 4 illustrates, in flow diagram form, a method of determining payload without using any coding.

Referring to FIG. 4, an illustrative method of determining payload without using any coding is disclosed. In this illustrative method, a target signal-to-noise ratio (SNR) reference table for a desired bit error rate (BER) is selected, at step 402. Each value SNRref(i) of the SNR reference table is then adjusted based on performance margin (PM) information, at step 404. Performance margin is the amount of extra margin required to account for changes in channel characteristics. For example, if the channel performance is known to vary within a 2 dB range over the time, using 2 dB of performance margin will allow the system to maintain the desired BER performance. As long as the channel conditions do not degrade more than the amount of system performance margin, performance is maintained.

At step 406, the maximum the channel capacity MAXCAP_UNC is determined using the adjusted SNR reference table and measured SNR values for the channel. One exemplary method for determining the capacity with such data is described in U.S. patent application No. 08/937,759, entitled "Method and Apparatus for Configuring A Communication System," filed Sep. 25, 1997 by Levin, and in U.S. Pat. No. 5,852,633, entitled "Method for Allocating Data in a Data Communication System" issued Dec. 22, 1998 to Levin et al., both of which are hereby incorporated by reference herein in their entirety. Another method of determining the capacity is described hereinafter with reference to FIG. 8.

The presently discussed embodiment uses SNR reference tables which are updated with coding gains and performance margin, and the channel SNRs are compared to the SNR reference tables to generate capacity. Fine gain adjustments are used in the capacity calculation instead of computing fine gains as a post-allocation process. Fine gains are power adjustments in a limited range which can be used to equalize the SNR margin amongst carriers in a DMT system. For standard compliant ADSL, the range of power adjustment is +/−2.5 dB. For example, if a carrier has a pre-fine gain SNR margin of 2 dB, and a fine gain of 1 dB, the resulting SNR margin is 3 dB. By considering the fine gain adjustments during capacity calculations, resulting capacities reflect full use of the communication bandwidth. An additional benefit is that the optimal fine gains adjustments are generated during the capacity calculation for the maximum capacity allocation. Previous capacity calculations computed maximum capacities without considering the effects of fine gain adjustments. The use of fine gain adjustments to calculate channel capacity is discussed hereinafter with reference to FIG. 8.

At step 408, a predetermined overhead value, such as the framing value FOH for ADSL systems, is then subtracted from the capacity MAXCAP_UNC determined in step 406 to produce the uncoded payload PAYLOAD_UNC which is the user available capacity of the channel without coding.

Figure 5:
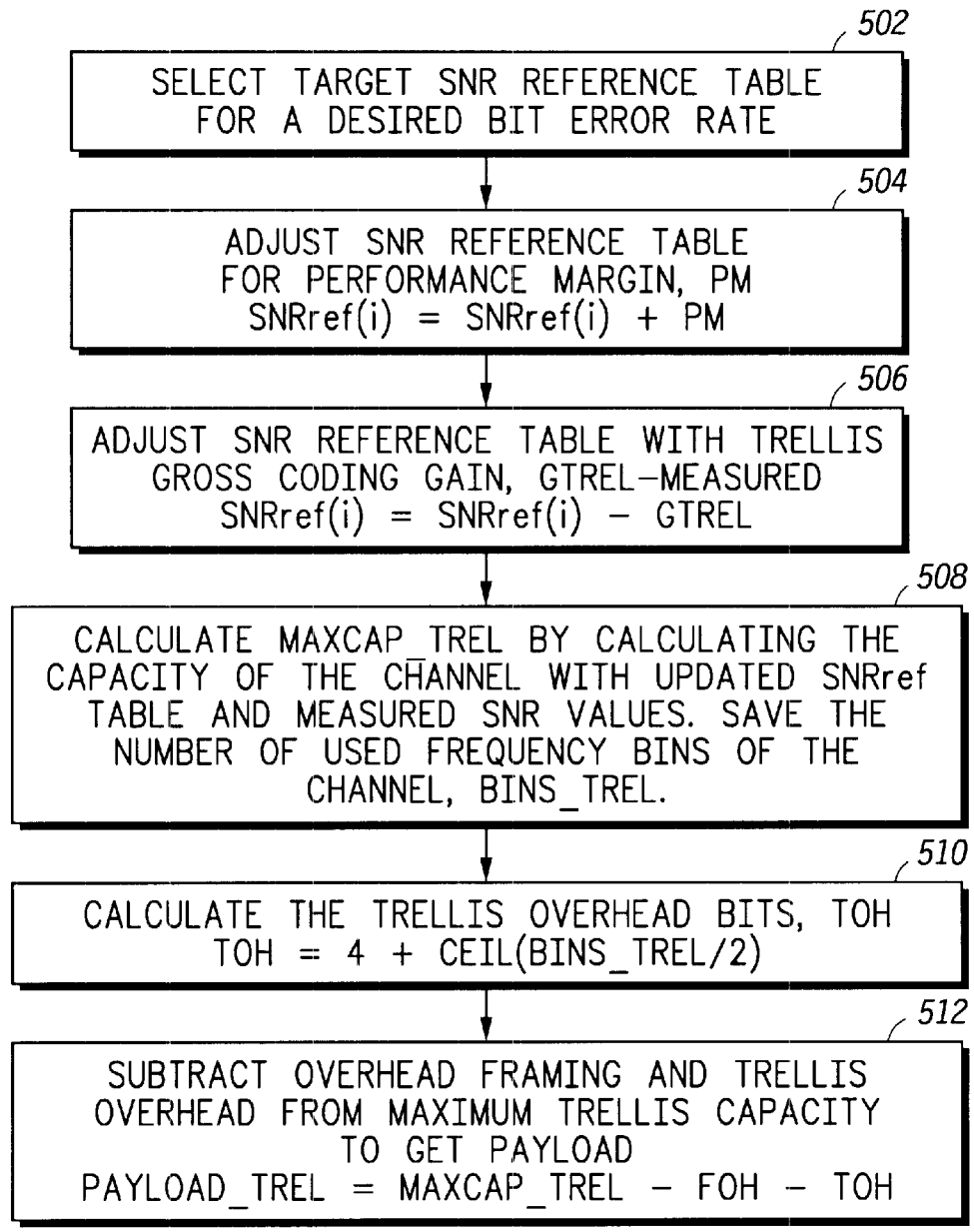
FIG. 5 illustrates, in flow diagram form, a method of determining payload for a channel using Trellis encoding.

Referring to FIG. 5, an illustrated method of determining payload for a channel using Trellis encoding is disclosed. The SNR reference table for the desired bit error rate (BER) is selected at step 502, and then adjusted for performance margin at step 504. The SNR reference table is then further adjusted with a Trellis gross coding gain GTREL at 506. For example, each value SNRref(i) of the SNR reference table is adjusted by subtracting the Trellis gross gain GTREL. A Trellis gross gain look up table can be used. The Trellis gross gain can be based on the desired input or output bit error rate. An example of a Trellis gross gain table based on its input BER is as follows:

| BER | 10-3 | 10-4 | 10-5 | 10-6 | 10-7 | 10-8 | 10-9 |
|---|---|---|---|---|---|---|---|
| Gain dB | 2.5 | 3 | 4 | 4.7 | 5 | 5.5 | 5.8 |

At step 508, a maximum Trellis capacity MAXCAP_TREL of the channel is calculated with the updated SNR reference table and the measured SNR values for the channel using a capacity calculation method. The number of frequency bins (BINS_TREL) that have capacity greater than zero bits is computed. The overhead for Trellis coding, labeled TOH (Trellis overhead bits), is determined by the formula shown in FIG. 5 at step 510. The Trellis overhead is equal to the number of bins used, divided by 2, rounded up, and then added to 4 as shown. The ceiling operation (CEIL) is a rounding up. For example, if the operand were at a value of 3.1 the ceiling would then be 4. Thus, the ceiling function takes any fractional amount up to the next highest integer value. At step 512, the overhead such as framing overhead FOH and the Trellis overhead TOH are then subtracted from the Trellis capacity MAXCAP_TREL to produce a payload measurement PAYLOAD_TREL for the Trellis encoded system. Framing overhead is based on the structure of DMT data transmission and specified in the ADSL standard. The formula in step 512 provides that the payload for Trellis is equal to the maximum capacity using Trellis encoding minus the framing overhead and minus the Trellis overhead.

Figure 6:
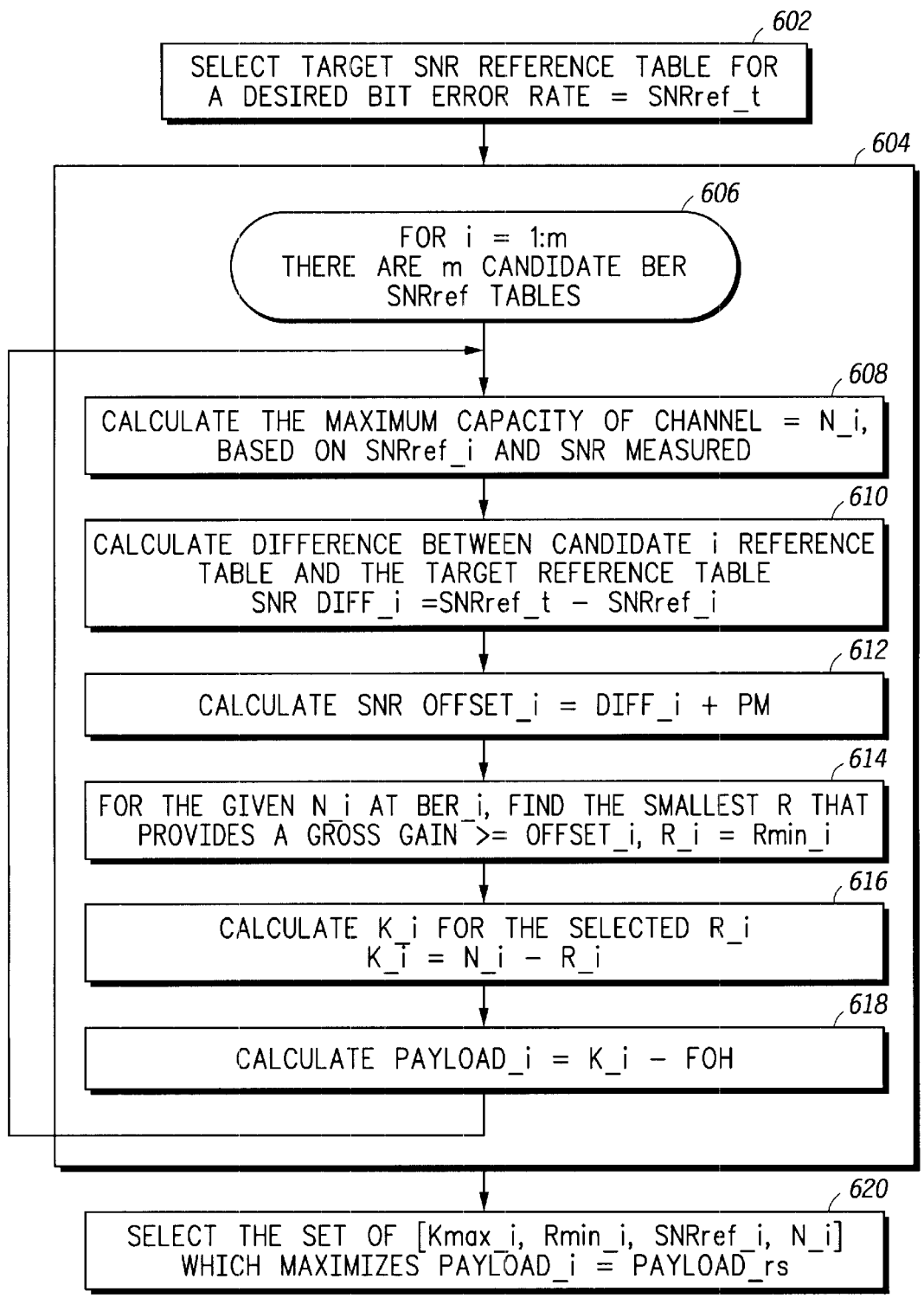
FIG. 6 illustrates, in flow diagram form, a method of determining user payload based on Reed-Solomon encoding.

Referring to FIG. 6, an illustrative method of determining user payload based on Reed-Solomon encoding is disclosed. The Reed Solomon (RS) coding configuration is based on three parameters: redundancy, R, payload data, K, and number of DMT data frames per RS codeword, S. The RS codeword is the total amount of DMT data for which R bytes of redundancy are used for error correction. The codeword size is variable and does not have to be the DMT frame size. For example, if the payload per DMT data frame is 10 bytes, S equals 1, and R equals 2 bytes, then 2 bytes of redundancy are used to correct 10 bytes of payload data. If the payload is 10 bytes per frame, S equals 4, and R equals 4, then 4 bytes of redundancy are used to correct 40 bytes of data (4 frames of 10 bytes each). Setting S to a value greater than one provides the advantage that the cost of overhead is spread over multiple DMT frames. Although the gross coding gain is also reduced when S is greater than 1, the reduction in cost can outweigh the reduction in gain.

As shown in FIG. 6, a target SNR reference table SNRref_t for the desired BER is selected, at step 602. An iterative loop is then entered for a set of candidate BERs, at 604. For each group of m BERs, there is a candidate BER SNR reference table as shown at step 606. For a particular iteration of loop 604 and for a selected BER SNR reference table SNRref_i, a capacity N_i of the channel is calculated based on the SNR reference table SNRref_i and the measured SNR values, at step 608. A difference is calculated between a particular ith candidate BER reference table SNRref_i and a target SNR reference table SNRref_t. This difference measurement is shown at step 610. Since there can be a different value for each constellation size in an SNR reference table, the difference DIFF_i calculated in step 610 can be based on the same element in the two different tables or the average difference between respective elements. At step 612, an SNR offset OFFSET_i is calculated by adding the difference determined in step 610 to a performance margin value PM that may optionally be provided from a user. At step 614, for a particular capacity N_i at the ith BER, a smallest redundancy value Rmin_i that provides a gross gain exceeding or equaling the offset is determined. One method of selecting the minimum R is to use a gross gain table which provides the gross gain for a capacity, N, based on R, the amount of redundancy. The example table listed below is in byte quantities. There can be a different table for each BER.

Exemplary Reed-Solomon Gross Gain Tables for Given BERs

BER 1e-4

|  | R = 2 | R = 4 | R = 6 | R = 8 | R = 10 | R = 12 | R = 14 | R = 16 |
|---|---|---|---|---|---|---|---|---|
| N = 20 | 2.30 | 4.05 | 5.40 | 6.50 | 7.42 | 8.21 | 8.90 | 9.52 |
| N = 40 | 1.98 | 3.60 | 4.89 | 5.95 | 6.85 | 7.62 | 8.30 | 8.90 |
| N = 70 | 1.72 | 3.21 | 4.45 | 5.48 | 6.36 | 7.12 | 7.80 | 8.40 |
| N = 110 | 1.49 | 2.88 | 4.07 | 5.07 | 5.94 | 6.69 | 7.36 | 7.96 |
| N = 180 | 1.25 | 2.50 | 3.62 | 4.59 | 5.44 | 6.18 | 6.84 | 7.44 |
| N = 255 | 1.07 | 2.22 | 3.28 | 4.22 | 5.05 | 5.79 | 6.44 | 7.04 |

BER 1e-5

|  | R = 2 | R = 4 | R = 6 | R = 8 | R = 10 | R = 12 | R = 14 | R = 16 |
|---|---|---|---|---|---|---|---|---|
| N = 20 | 2.55 | 4.32 | 5.65 | 6.71 | 7.60 | 8.35 | 9.01 | 9.60 |
| N = 40 | 2.33 | 4.01 | 5.30 | 6.34 | 7.21 | 7.95 | 8.60 | 9.17 |
| N = 70 | 2.14 | 3.75 | 5.01 | 6.03 | 6.88 | 7.62 | 8.26 | 8.83 |
| N = 110 | 1.99 | 3.54 | 4.76 | 5.77 | 6.61 | 7.34 | 7.98 | 8.55 |
| N = 180 | 1.82 | 3.29 | 4.48 | 5.46 | 6.30 | 7.02 | 7.65 | 8.22 |
| N = 255 | 1.70 | 3.11 | 4.27 | 5.24 | 6.06 | 6.78 | 7.41 | 7.98 |

BER 1e-6

|  | R = 2 | R = 4 | R = 6 | R = 8 | R = 10 | R = 12 | R = 14 | R = 16 |
|---|---|---|---|---|---|---|---|---|
| N = 20 | 2.68 | 4.46 | 5.78 | 6.82 | 7.68 | 8.42 | 9.07 | 9.64 |
| N = 40 | 2.51 | 4.23 | 5.51 | 6.54 | 7.39 | 8.11 | 8.75 | 9.31 |
| N = 70 | 2.37 | 4.04 | 5.30 | 6.31 | 7.15 | 7.86 | 8.49 | 9.05 |
| N = 110 | 2.26 | 3.88 | 5.12 | 6.11 | 6.95 | 7.66 | 8.28 | 8.84 |
| N = 180 | 2.13 | 3.70 | 4.91 | 5.90 | 6.72 | 7.43 | 8.05 | 8.60 |
| N = 255 | 2.04 | 3.57 | 4.76 | 5.74 | 6.56 | 7.26 | 7.88 | 8.43 |

BER 1e-7

|  | R = 2 | R = 4 | R = 6 | R = 8 | R = 10 | R = 12 | R = 14 | R = 16 |
|---|---|---|---|---|---|---|---|---|
| N = 20 | 2.76 | 4.54 | 5.85 | 6.88 | 7.73 | 8.46 | 9.09 | 9.65 |
| N = 40 | 2.62 | 4.35 | 5.64 | 6.65 | 7.49 | 8.21 | 8.83 | 9.38 |
| N = 70 | 2.51 | 4.20 | 5.46 | 6.47 | 7.30 | 8.01 | 8.63 | 9.18 |
| N = 110 | 2.42 | 4.08 | 5.32 | 6.32 | 7.14 | 7.85 | 8.46 | 9.01 |
| N = 180 | 2.32 | 3.94 | 5.17 | 6.15 | 6.97 | 7.67 | 8.28 | 8.82 |
| N = 255 | 2.25 | 3.84 | 5.05 | 6.03 | 6.84 | 7.54 | 8.15 | 8.69 |

A user payload, labeled K_i, for a selected redundancy, labeled R_i, is determined at step 616. The resulting payload PAYLOAD_i for the particular candidate BER is then determined by taking the payload K_i at such BER less the overhead FOH, as shown at step 618. The previous steps 608–618 are then repeated during an iterative loop for each of the sets of candidate BERs. The candidate BERs are dependent upon the particular application and system design, but typically vary between $10^{-1}$ to $10^{-10}$. After the iterative loop 604 is completed, a maximum payload PAYLOAD_rs for all of the plurality of BER candidates is then determined, at step 620. In addition, the parameters corresponding to the selected maximum payload, namely payload, redundancy, SNR reference, and capacity, is generated.

Although the above discussion regarding FIG. 6 assumes the number, S, of DMT frames per RS codeword is one, S can be varied to achieve a gross gain versus overhead cost trade-off. For example, at step 608, the N_i values for each BER candidate could be multiplied by S, where S does not equal 1, to achieve a different codeword size, NS_i. For further example, in the case in which S equals 1, an exemplary value for N_i is 50. In a corresponding case in which S equals 2, the corresponding NS_i is 100. The offset calculated during step 612 does not depend on S, and remains unchanged. The minimum redundancy RS_i which achieves the gross gain for NS_i can be obtained using the method in 614. Then KS_i can be computed for each S value:

KS_i=NS_i-RS_i

Subsequently, for a given BER, the maximum DMT payload per frame is the maximum payload from the set of [KS_i/S] where S can be fractional, 1, or greater than 1.

Figure 7:
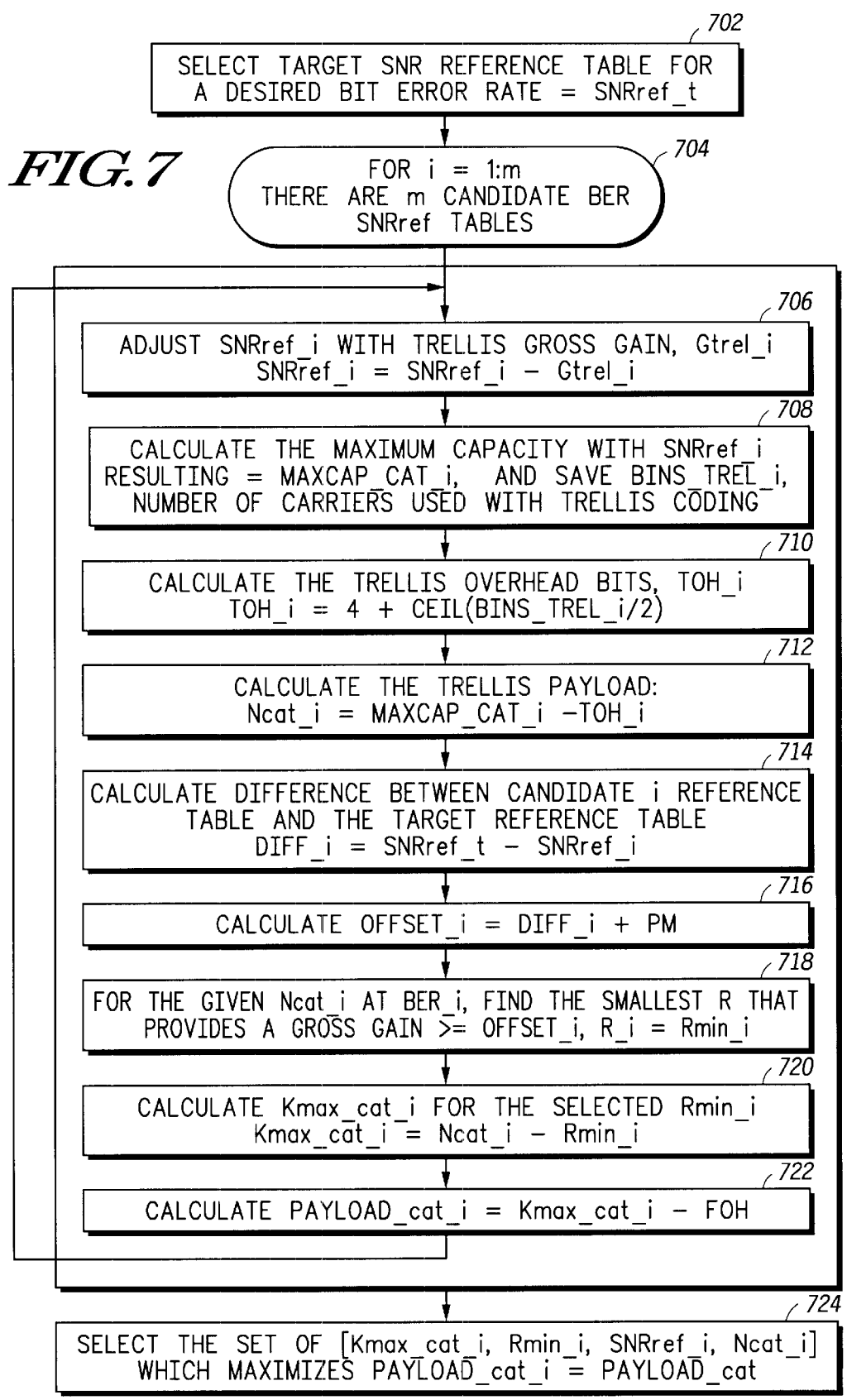
FIG. 7 illustrates, in flow diagram form, a method of determining a maximum payload for a channel with concatenated Trellis and Reed-Solomon encoding.

Referring to FIG. 7, an illustrative method of determining a maximum payload for a channel with concatenated Trellis and Reed-Solomon encoding is illustrated. A target SNR reference table for a desired BER is selected, at step 702. The loop at 704 processes a plurality of candidate error rates with corresponding BER SNR reference tables. The SNR reference table is adjusted with a Trellis gross coding gain (GTREL) at 706. The Trellis gross coding gains can be read from a table based on its input BER. (E.g., a Trellis gross gain table based on input BER such as that discussed above with reference to FIG. 5). At step 708, a maximum capacity MAXCAP$_{CAT}$_i of the channel is calculated with the updated SNR reference table and the measured SNR values for the channel. The number of frequency bins of the channel with capacities greater than zero are recorded. The overhead for Trellis coding, labeled TOH (Trellis overhead bits) is determined by the formula shown in FIG. 7 at step 710. The Trellis overhead is equal to the number of bins used, divided by 2, rounded up, and then added to 4 as shown. At step 712, the Trellis overhead (TOH) is then subtracted from the Trellis capacity (MAXCAP_CAT_i) to produce a payload measurement which is also the Reed-Solomon code word (Ncat_i) for the Trellis encoded system for S=1. A difference is calculated between a particular ith candidate BER reference table and a target SNR reference table. This difference measurement is shown at step 714. At step 716, an SNR offset is calculated by adding the difference determined in step 714 to a performance margin value that may optionally be provided from a user. At step 718, for a candidate BER and Trellis payload, a smallest redundancy value Rmin_i that provides a gross gain exceeding or equaling the offset is determined. One method of determining the redundancy is discussed above. A user payload, labeled Kmax_cat_i, for a selected redundancy, labeled Rmin_i, is determined at step 720. The resulting payload for the particular candidate BER is then determined by taking the payload, Kmax_cat_i, at such BER less the overhead, as shown at step 722. The previous steps 706–722 are then repeated during the iterative loop for each of the sets of candidate BERs. Upon completion of the iterative loop, a maximum payload for the concatenated coding technique is determined, at 724. In addition, the set of corresponding parameters for such concatenated encoding is also determined.

As described above, the S parameter can be varied to provide a number of different RS configurations with different RS_min_i. The KS_cat_i for the selected RSmin_i in step 720 can be generated for each of the S settings, and the configuration with the maximum KSmax_cat_i can be selected.

Figure 8:
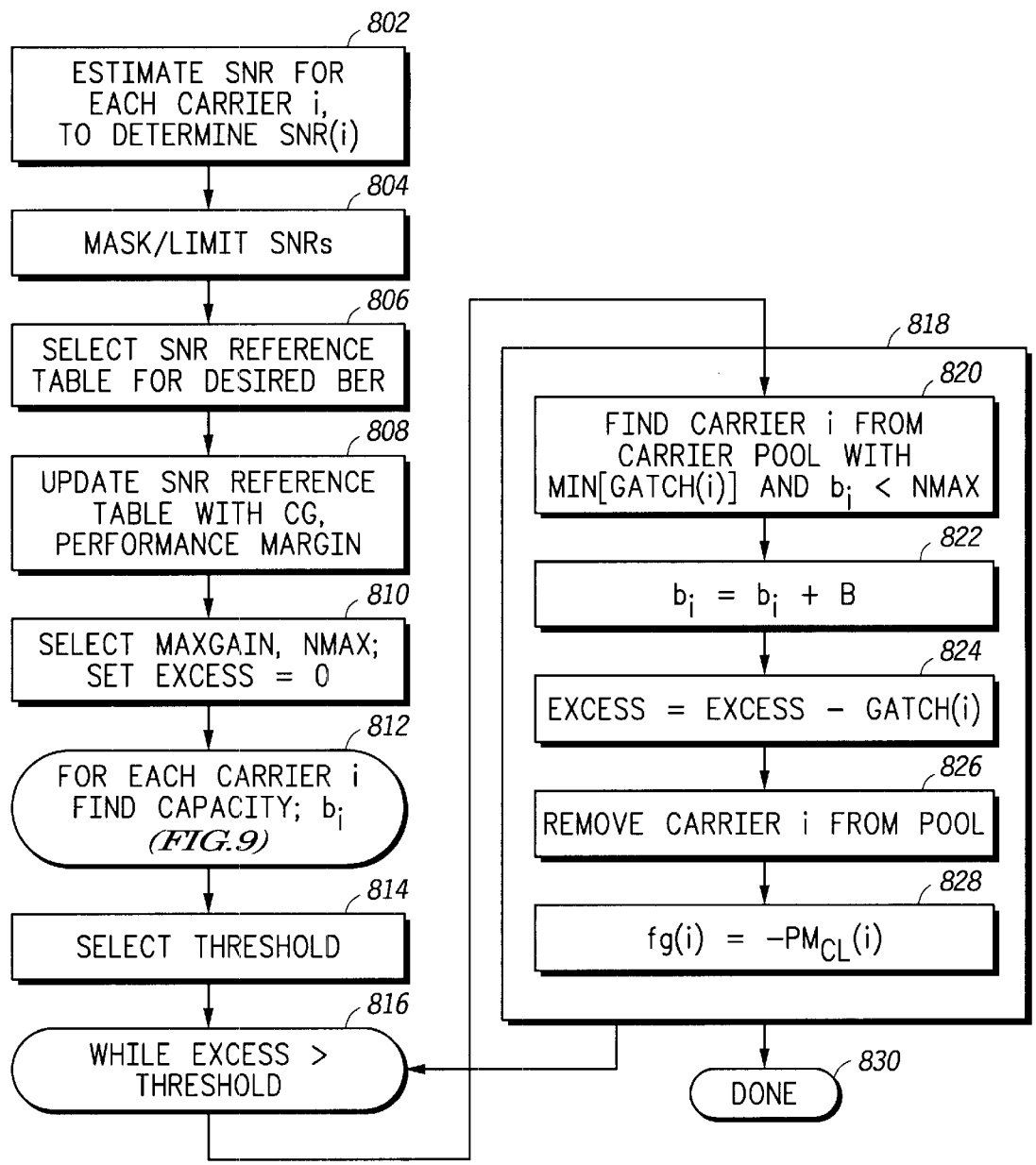
FIG. 8 illustrates, in flow diagram form, a method of estimating capacity of a multi-carrier communication channel using fine gain adjustments.

Referring to FIG. 8, a method of estimating capacity of a multi-carrier communication channel using fine gain adjustments is illustrated. At step 802, a signal-to-noise ratio (SNR) is estimated for each carrier i in the channel. The frequency bins with capacity less than a certain threshold are masked at step 804. An SNR reference table for the desired bit error rate is then selected at step 806. The selected SNR reference table is then updated based on coding gain (CG) and performance margin at step 808. Values for a maximum gain adjustment, MAXGAIN, a maximum number of bits per channel, NMAX, and an excess loop variable, EXCESS, are initialized at step 810. For each carrier i of the communication carrier channel, a carrier capacity $b_i$ is then determined at step 812. Determination of capacity is further discussed hereinafter with reference to FIG. 9. A threshold to be compared with the excess loop variable is determined at step 814 and used in a loop comparison at step 816 in which the excess value is compared to the threshold. While the excess value exceeds the threshold, processing continues at 818 for bit allocation to various carriers. At step 820, a carrier i is selected from a carrier pool. The carrier i is selected which has a minimum gatch and a particular carrier bit allocation $b_i$ which is less than the maximum number of bits per channel (NMAX). The gatch is the difference between the clipped current margin and clipped projected margin calculated in FIG. 9. The number of bits $b_i$ is incremented by B, at step 822, and the excess value is reduced by the applicable gatch for the selected carrier of the current iteration of loop 818 at step 824. B is an additional amount of bits based on bit allocation granularity and minimum bit allocation requirements. Typically, B is either 1 or 2. The currently selected carrier i is removed from the carrier pool at step 826. The fine gains fg(i) for the carrier is then set equal to the negative of the clipped performance margin for the carrier $PM_{CL}(i)$ step 828. Next, the excess value is compared to the threshold at step 816. While the excess value exceeds the threshold, processing then continues again at step 818 and a new carrier is selected from the pool at step 820. Processing for the newly selected carrier proceeds in like manner as described above. When the excess value no longer exceeds the threshold at step 816, processing of the carriers is then completed at step 830.

If at the completion of the processing in FIG. 8, the total aggregate power exceeds a required aggregate power limit, the fine gains can be reduced to meet the aggregate required power level. Additionally, if the total aggregate power is below the aggregate power limit, the fine gains can be increased to meet the aggregate power limit.

Figure 9:
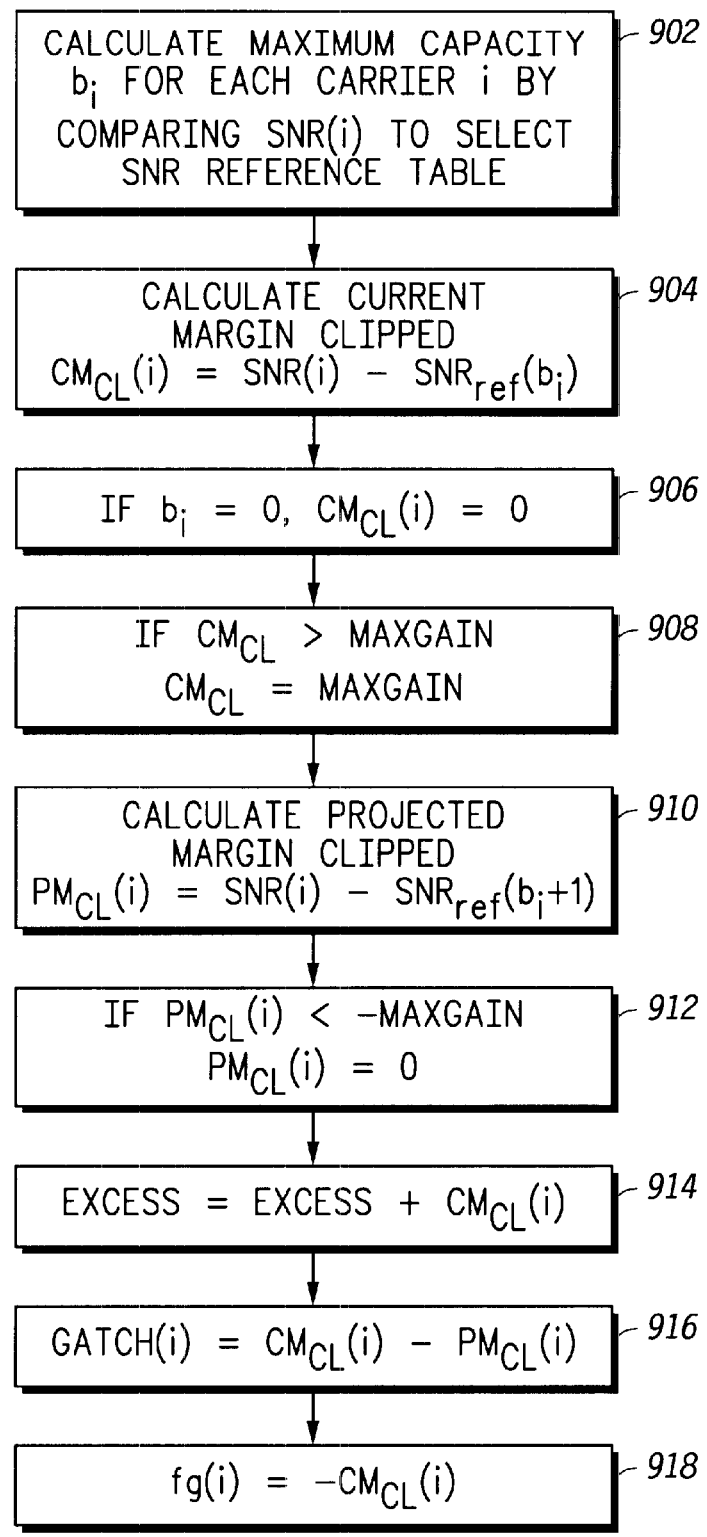
FIG. 9 illustrates, in flow diagram form, a method of finding carrier capacities.

Referring to FIG. 9, the method of finding each carrier capacity referenced in FIG. 8 at step 812 is further illustrated. The maximum capacity is calculated for each carrier by comparing the SNR for that carrier to the selected SNR reference table at step 902. Current margin clipped $CM_{CL}(i)$ is then calculated by taking the SNR for the particular carrier SNR(i) less the SNR reference value SNRref for the given capacity $b_i$ at step 904. If the capacity $b_i$ equals zero, then the clipped value for the particular carrier is set to zero at step 906. If the clipped value exceeds the maximum gain adjustment then the clipped value is set equal to the maximum gain adjustment at step 908. At step 910, a projected clipped value for the carrier is set equal to the SNR of the carrier less the SNR reference value for the capacity $b_i$ incremented by 1 (or a larger bit granularity). If the projected margin clipped value for the carrier is less than the negative of the maximum gain adjustment, then the projected margin value for the carrier is set equal to zero at step 912. The excess value is then set equal to the excess value incremented by the calculated clipped value for the carrier at step 914. A gatch value for the particular carrier is set equal to the clipped value less the projected margin clipped value for the selected carrier at step 916. A fine gain value fg(i) is set equal to the negative of the clipped value for the particular carrier as shown at step 918. The prior calculations 904 to 918 are then repeated for each carrier of the channel.

By applying fine gain adjustments to the various capacity measurements and various bit allocations of the channel, overall capacity is increased using the above method described with respect to FIGS. 8 and 9.

Figure 10:
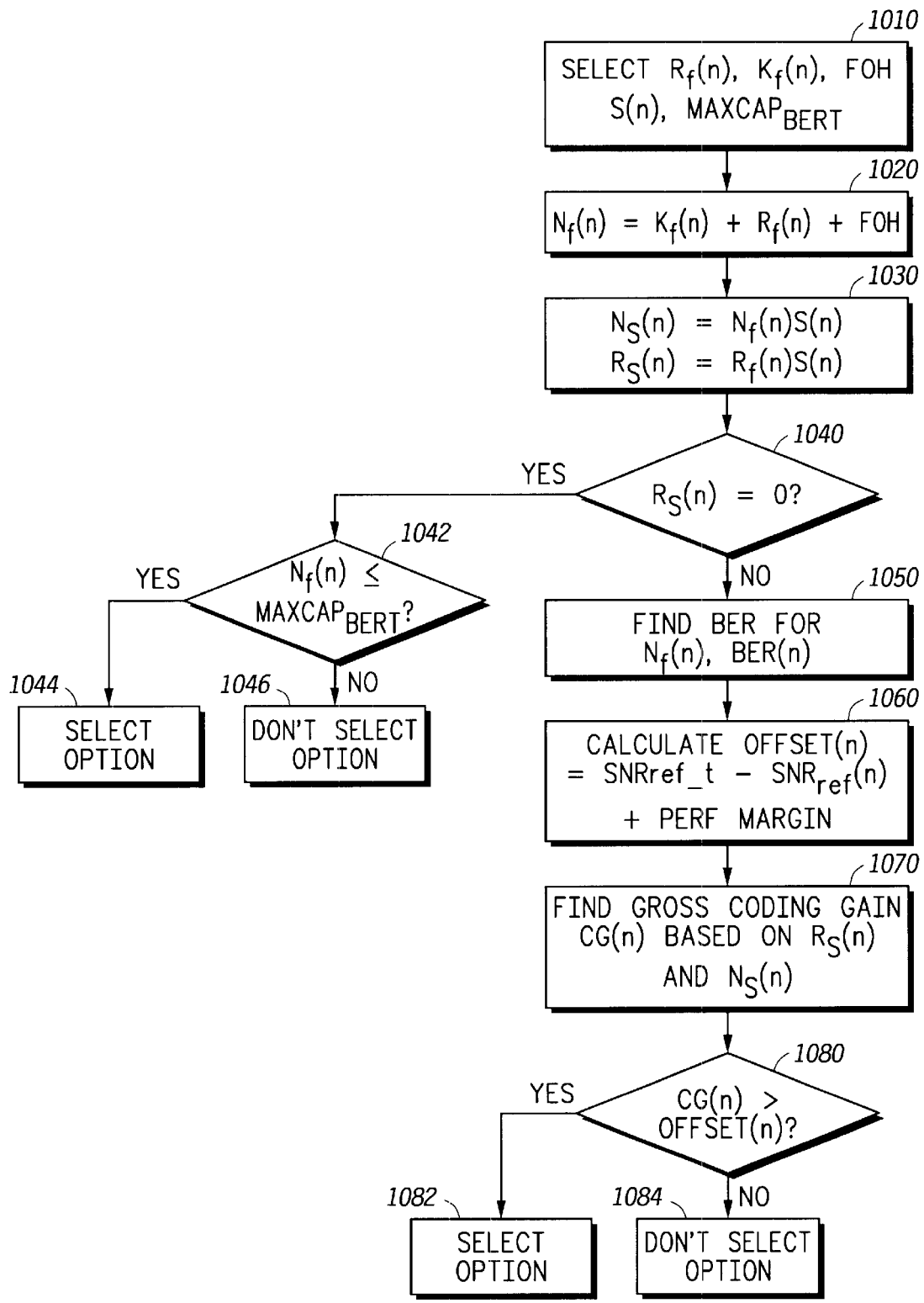
FIG. 10 illustrates, in flow diagram form, a method of selecting a rate option.

FIG. 10 discloses a method for selecting a rate option from amongst the rate options received by transceiver 34 from the central office transceiver 42 at step 222 of FIG. 2. Referring to step 1010 of FIG. 10, for a first selected rate option n, the redundancy per frame $R_f(n)$, the user payload $K_f(n)$, the framing overhead FOH, and the number of frames per Reed-Solomon (RS) code word S(n) are selected. The maximum capacity for a targeted bit error rate MAXCAP$_{BERT}$ can be calculated using trellis coding or no trellis coding as described in FIGS. 4 and 5. For trellis coding, the corresponding gross trellis gain used to calculate MAXCAP$_{BERT}$ can be based on BER. At step 1020, the total data rate per frame $N_f(n)$ is determined to be the payload per frame $K_f(n)$ plus the redundancy per frame $R_f(n)$+FOH. At step 1030, the total data rate per Reed Solomon code word $N_s(n)$ is determined to be the total data rate per frame $K_f(n)$ multiplied by the number of frames per Reed Solomon code word S(n). The redundancy per Reed Solomon code word $R_s(n)$ is also determined to be redundancy per frame $R_f(n)$ multiplied by the number of frames per Reed Solomon code word S(n).

At decision 1040, it is determined whether the redundancy per Reed Solomon code word $R_s(n)$ equals zero. If the redundancy per RS code word $R_s(n)$ equals zero, control transitions to step 1042. At step 1042 the total data rate per frame $N_f(n)$ is compared to the maximum capacity at the targeted bit error rate MAXCAP$_{BERT}$. If the total data rate per frame $N_f(n)$ is less than or equal to the maximum capacity of the targeted error rate MAXCAP$_{BERT}$, control transitions to step 1044 where the rate option currently being analyzed (e.g., the nth rate option) is selected for subsequent data transmission. If the total data rate per frame $N_f(n)$ is greater than the maximum capacity of the targeted bit error rate MAXCAP$_{BERT}$, control transitions to step 1046 where the rate option being analyzed (e.g., the nth rate option) is not selected. Control then transitions to step 1010 and the process is repeated for the next rate option (e.g., the n+1 rate option).

If, at decision 1040, the redundancy per RS code word $R_s(n)$ is not determined to be equal to zero, control transitions from decision 1040 to step 1050. At step 1050, the bit error rate for total data rate per frame of the current rate option (BER(n)) is determined. For example, the bit error rate corresponding to the calculated capacity which is closest to the current rate option is selected using the following table:

| BER | $10^{-3}$ | $10^{-4}$ | $10^{-5}$ | $10^{-6}$ | $10^{-7}$ |
|---|---|---|---|---|---|
| Max Capacity (bytes) | 120 | 110 | 100 | 90 | 85 |

The BER for $N_f(n)$ can be determined using a comparison of the BER to the maximum capacity listed above. The above table can be populated by calculating the capacity of the communication channel based on the SNR reference table for each BER and the measured SNRs.

At step 1060, the offset for the current rate option n is determined to be the targeted SNR reference value SNRref_t minus the SNR reference value SNR$_{ref}$(n) for the bit error rate determined at step 1050 plus performance margin. At operation 1070, the gross coding gain CG(n) for the current rate option is determined using the gross gain table for the bit error rate determined at step 1050. At decision 1080 the gross current gain is compared to the offset. If the gross current gain is greater than the offset, control transitions to step 1082 where the current rate option is selected. If the gross coding gain is less than or equal to the offset control transitions to step 1084 where the current rate option is not selected. Control transitions from step 1084 to step 1010 to analyze the next rate option.

In steps 1042 and 1080 a threshold can be defined so that decisions are not hard limited. For example in step 1042, if $N_f(n)$ is 0.0001 greater than MAXCAP$_{BERT}$, option n could still be selected if the threshold was set at 0.01.

The illustrative methods described with reference to FIGS. 2–10 may be implemented in many ways. One particular implementation is to code such methods in computer software, such as assembly code that executes on a suitable digital signal processor, or other processing unit, embedded within a digital transceiver, such as ADSL transceivers 42 or 34. The software may be downloaded into computer readable form such as by burning the software into a read only memory that is coupled to the digital signal processor. In an alternative implementation, the method steps described herein may be coded in a high level computer language, such as C language, and then loaded into a memory that is accessible to a processing device such as digital signal processor, microprocessor or other similar execution unit. Exemplary memories 43 and 35 are shown in FIG. 1.

The particular illustrative embodiments described herein have many benefits to a variable data rate communication system. For example, by intelligently selecting error correction methods and parameters on a per channel basis based on measured SNR and other channel characteristics, payload usable for data transmission may be greatly increased. Increased payload from the intelligent selective error correction methodology described in this application, can lead to improved transmission work data rates and thereby result in more data, video text, and voice, over a given channel and system. The result is higher over all bandwidth and usability of the communication system. Another advantage of improved coding and resulting payload performance increases, is that depending on the length of communication channel, such as twisted pair links having a length greater than 18000 feet or greater, systems not performing efficient coding matched to the channel may not be able to communicate data at all. Thus, the present illustrated embodiments may provide service to users otherwise unable to use a corresponding multicarrier communication system due to such system not being implemented based on the teachings herein.

While one or more embodiments are described herein, it will be understood that such embodiments are illustrative of the invention and that the scope of the invention is not limited to them. Rather, the scope of the invention is defined in the claims that follow this detailed description. Thus, other embodiments of the invention include various modifications, additions, and/or improvements to the embodiments discussed herein.

In one embodiment, a method of processing data associated with a communication channel is provided. A first channel payload for the communication channel is determined using a first type of error correction (e.g., Trellis error correction). A second channel payload for the communication channel is determined using a second type of error correction (e.g., Reed-Solomon error correction). The first and second channel payloads are then compared. The communication channel may then be configured using one of the first and second types of error correction corresponding to a largest one of the first and second channel payloads. Additional channel payloads for the communication channel may be determined using a other types of error correction, including concatenated or combined error correction. In such a case, the additional channel payloads are compared with each other and with the first and second channel payloads, whereafter the communication channel may be configured using the type of error correction corresponding to the largest one of the all of the channel payloads. Also, a channel payload may be determined using no error correction. The no error correction payload may also be compared to the other payloads to determine whether error correction should be enabled at all. For example, no error correction should be used where the no error correction payload is larger than the other payloads.

In another embodiment, a method for communicating over a digital communication channel is provided. A message is communicated over the digital communication channel. The message includes a first indicator identifying whether error correction is enabled. The indicator is determined based upon channel characteristics. The channel characteristics may include, for example, a gross error correction gain which is independent of error correction overhead. A first channel payload may be determined for the communication channel using the error correction. A second channel payload may be determined for the communication channel using no error correction. The first and second channel payloads may then be compared. The first indicator may then indicate that error correction is enabled when the first channel payload is larger than the second channel payload, and that error correction is disabled when the second channel payload is larger than the first channel payload. The message may include a second indicator to identify whether error correction is available. The first indicator may identify whether the error correction is disabled even if the error correction is available. After comparing the first and second channel payloads, the first indicator may be asserted to indicate that the error correction is available, and the second indicator is asserted when the second channel payload is larger than the first channel payload and deasserted when the first channel payload is larger than the second channel payload. The error correction may be Trellis coding, Reed-Solomon coding, or both Trellis coding and Reed-Solomon coding, for example.

In another embodiment, a method of communicating over a digital communication channel is provided. The digital communication channel is activated so that data may be communicated over the data communication channel. Any error correction present over the digital communication channel is disabled based upon channel characteristics (e.g., when a measured channel payload using no error correction is larger than a measured channel payload using error correction). Data communication may therefore be enhanced over such a digital communication channel while the error correction is disabled.

In another embodiment, a method of configuring a communication system using gross gain is provided. An uncoded payload is determined. At least one coded payload is determined using at least one of a plurality of codes. One of the uncoded payload and the at least one coded payload is determined to have the greatest payload. The communication system is configured to use a code corresponding to the greatest payload if the greatest payload is a coded payload, and the communication system is configured without using a code if the uncoded payload is the greatest payload.

In another embodiment, a method of calculating payload based upon channel characteristics of a data communication channel is provided. Channel SNRs of the data communication channel are measured. A target SNR reference table is selected for a target bit error rate. The target SNR reference table is adjusted by applying at least one of a gross coding gain and a performance margin. A payload is determined by calculating a channel capacity based on the measured channel SNRs and the target SNR reference table. More than one payload may be determined. For example, a first coded payload may be determined using a first code, a second coded payload may be determined using a second code, and a concatenated payload may be determined using the first and second codes. The payload may be an uncoded payload or a coded payload. The channel capacity may be adjusted based on predetermined overhead or coding overhead, which may be zero.

In another embodiment, a method of initializing a digital communication channel includes activating the channel, determining channel characteristics for the channel, and selecting an error correction configuration from among a plurality of error correction configurations based on the channel characteristics. The channel characteristics may include, for example, signal-to-noise ratios.

In another embodiment, a method of determining a payload for a block coded error correction configuration (e.g., a Reed-Solomon error correction configuration) is provided. One or more of the following operations is performed: (1.) a capacity of a digital communication channel is calculated based upon reference signal-to-noise ratio values and based upon measured signal-to-noise ratio values; (2.) a difference between reference signal-to-noise ratio values and target reference signal-to-noise ratio values is calculated; and (3.) a redundancy value is determined which provides a coding gain that exceeds a difference between reference signal-to-noise ratio values and target reference signal-to-noise ratio values. The payload of the digital communication channel is then determined.

In another embodiment, an apparatus includes a data processing unit, at least one computer readable medium and a plurality of software modules. The at least one computer readable medium is coupled to the data processing unit. A first software module is encoded on the at least one computer readable medium to be executable by the data processing unit to activate a digital communication channel. A second software module is encoded on the at least one computer readable medium to be executable by the data processing unit to determine channel characteristics for the digital communication channel. A third software module is encoded on the at least one computer readable medium to be executable by the data processing unit to select one of a plurality of error correction configurations based on the channel characteristics. The first, second and third software modules may be incorporated into the same or another software module. Each of the first, second and third software modules may consist of one or more computer program instructions.

Any type of multicarrier communication system employing error correction may be used. Although system 30 uses Asymmetric Digital Subscriber Line (ADSL), other types of digital subscriber line technologies may be used. A few of the many other exemplary digital subscriber line technologies include the following: ADSL Lite, DSL Lite, G.Lite, IDSL (ISDN DSL), SDSL, splitterless ADSL, UDSL (Unidirectional DSL), ×2/DSL, and any presently available or future variants thereof. The above listed variants of digital subscriber line technology are often collectively referred to as ×DSL. Each technology offers different speeds, ranges, and operating characteristics.

Those skilled in the art will recognize that the boundaries between logic blocks are merely illustrative and alternative embodiments may merge such blocks or impose an alternative decomposition of functionality of blocks. For example, splitter 44 and ADSL transceiver 42 may be merged into an ADSL modem unit coupled to a memory. Also, alternate embodiments of system 30 may include more, fewer, or different blocks. For example, alternate embodiments of system 30 may or may not have some of or different types of peripheral devices 50–56. Some embodiments may combine multiple instances of a particular component.

The functionality described herein may be performed by or in many types of transceiver units. For example, transceiver 42 may be, include or placed within any type of processing unit including but not limited to a microprocessor (e.g., a processing unit fabricated on a single integrated circuit chip), a microcontroller (e.g., a microprocessor including memory and/or I/O devices integrated therein), a multi-chip module processing unit, a computer system board, an embedded computer system and/or a general purpose computer system. Also, blocks of circuitry may include or be replaced by modules of software, or general purpose circuitry for execution of modules of software, or software for simulating such blocks of circuitry.

Furthermore, those skilled in the art will recognize that the boundaries between the functionality of the steps described in the exemplary embodiment (e.g., FIGS. 2–10) are for illustration only. The operations, decisions or other functionality thereof may be combined in fewer steps or may be distributed in additional steps in accordance with the invention. Moreover, alternative embodiments may include multiple instances of a particular step or different sequencing of steps.

Some or all of the blocks of FIGS. 2–10 may be executed by, and therefore represent, instructions or a module (e.g., a software module) or a portion of a module and/or a computer system user. Thus, the above described method, the operations thereof and any modules therefor may be executed on a computer system configured to execute the operations of the method and/or may be executed from machine-readable and/or computer-readable media. The method may be embodied in a computer-readable medium for configuring a computer system to execute the method. Thus, the software modules may be stored within and/or transmitted to a computer system memory to configure the computer system to perform the functions of the module.

The steps described herein and any software modules therefor may be received by transceiver 42, for example, from computer readable media such as memory 43. Computer readable media may be permanently, removably or remotely coupled to transceiver 42. Computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory/storage including semiconductor-based memory units such as FLASH memory, EEPROM, EPROM, ROM; ferromagnetic memory units; volatile storage media including registers, buffers or caches, main memory, RAM, etc.; application specific integrated circuitry; and data transmission media including computer network, point-to-point telecommunication, and carrier wave transmission media. In a UNIX-based embodiment, the software modules or portions thereof may be embodied in a file which may be a device, a terminal, a local or remote file, a socket, a network connection, a signal, or other expedient of communication or state change. Other new and various types of computer-readable media may be used to store and/or transmit software modules including the operations and decisions discussed herein.

In one embodiment, ADSL remote terminal 32 is a computer system or is a card in a computer system such as a personal computer system. Other embodiments may include different types of computer systems. Computer systems are information handling systems which can be designed to give independent computing power to one user or a plurality of users. Computer systems may be found in many forms including but not limited to mainframes, minicomputers, workstations, servers, personal computers, notepads and embedded systems. A typical computer system includes at least one processing unit, associated memory and a number of input/output (I/O) devices. Exemplary I/O devices include display monitors, keyboards, diskette drives, fixed disk storage devices, printers, modems (e.g., an ADSL modem including ADSL transceiver 42 and splitter 44), sound and video devices or specialized communication devices, computer readable media such as floppy or hard disk drives and CD-ROM drives. Many such computer systems use a system board to electrically connect these components together. A computer system processes information according to a program and produces resultant output information via the I/O devices. A program is a list of internally stored instructions such as a particular application program and/or an operating system. A software module may include a program. The programs that control the operation of a computer system are commonly referred to as software applications or simply software.

Often, though not necessarily, the quantities or operations described herein require the manipulation of or take the form of electrical or magnetic signals capable of being stored, transferred, combined, compared, and otherwise manipulated. It proves convenient at times, principally for reasons of convention and common usage, to refer to these signals as bits, values, elements, symbols, characters, terms, numbers, or the like. It should be understood, however, that all of these and similar terms are to be associated with the appropriate physical features of the particular embodiment or embodiments thereof where necessary.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." As used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended, such an intent will be explicitly recited in the claim, and in the absence of such recitation no such limitation is present or intended. For example, in the claims below, when a claim element is described as having "one" feature, it is intended that that element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein by Applicants as being identical to the accepted interpretation adopted by many courts in the past, notwithstanding any anomalous or precedential case law to the contrary that may be found. Similarly, when a claim element is described in the claims below as including or comprising an aforementioned feature (e.g., "the" feature), it is intended that that element not be limited to one and only one of the feature described. Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

The above description is not intended to present an exhaustive list of embodiments of the invention. Although an attempt has been made to outline some exemplary embodiments and exemplary variations thereto, other embodiments and/or variations are within the scope of the invention as defined in the claims below.

What is claimed is:

1. A method of transmitting data, comprised of symbols that comprise a channel payload and error correction bits, at a bit error rate of better than or equal to a predetermined error rate via a communication channel, the method comprising:

determining a channel characteristic of the communication channel;

performing a calculation to determine a first type of error correction that satisfies said bit error rate and determines a first channel payload associated with the first type of error correction, wherein the calculation includes the characteristic of the communication channel and coding gain associated with the first type of error correction;

performing a calculation to determine a second type of error correction that satisfies said bit error rate and determines a second channel payload associated with the second type of error correction, wherein the calculation includes the characteristic of the communication channel and coding gain associated with the second type of error correction; and selecting the first type of error correction if the first channel payload is greater than the second channel payload and the second type of error correction if the second channel payload is greater than the first channel payload.

2. The method of claim 1 wherein the first error correction configuration provides Trellis error correction for the communication channel.

3. The method of claim 2 wherein the second error correction configuration provides Reed-Solomon error correction for the communication channel.

4. The method of claim 1, further comprising:

performing a channel analysis on the communication channel to produce a signal to noise ratio of the communication channel; and wherein:

the step of calculating the first channel payload further comprises using the signal to noise ratio; and the step of calculating the second channel payload further comprises using the signal to noise ratio.

5. A method of configuring a communication system for communicating data over a communication channel, the method comprising:

measuring a signal to noise ratio of the communication channel;

making a calculation to determine an uncoded payload for a target bit error rate, wherein the calculation includes the signal to noise ratio;

making a calculation to determine a coded payload for the target bit error rate, wherein the calculation includes the signal to noise ratio and coding gain;

determining which of the uncoded payload and the coded payload is a greatest payload;

configuring the communication system to use a code corresponding to the greatest payload if the greatest payload is a coded payload; and configuring the communication system to not use a code if the uncoded payload is the greatest payload.

6. A method of determining a payload based upon channel characteristics of a data communication channel, the method comprising:

measuring channel SNRs of the data communication channel;

selecting a target SNR reference table for a target bit error rate;

adjusting the target SNR reference table by applying at least one of a gross coding gain and a performance margin; and determining a payload by calculating a channel capacity based on the measured channel SNRs and the target SNR reference table.

7. The method of claim 6 wherein the payload is an uncoded payload.

8. The method of claim 7 further comprising: adjusting the channel capacity based on predetermined overhead.

9. The method of claim 6 wherein the payload is a coded payload.

10. The method of claim 9 wherein the determining the payload comprises:

calculating coding overhead;

adjusting the channel capacity based on predetermined overhead; and adjusting the channel capacity based on the coding overhead.

11. The method of claim 10 wherein at least one of the predetermined overhead and the coded overhead is zero.

12. The method of claim 10 wherein the coded payload is a Trellis coding payload; and the coding overhead is Trellis overhead.

13. The method of claim 10 wherein the coded payload is a Reed-Solomon coding payload; and the coding overhead is Reed-Solomon overhead.

14. The method of claim 6 wherein the determining the payload comprises:

determining a first coded payload using a first code;

determining a second coded payload using a second code; and determining a concatenated payload using the first and second codes.

15. A method of initializing a digital communication channel for transmitting at bit error rate not to exceed a predetermined bit error rate, the method comprising:

activating the channel;

performing a channel analysis on the communication channel to produce a signal to noise ratio of the communication channel;

performing calculations to determine a plurality of types of error correction that satisfy the predetermined bit error rate for the communication channel and to determine channel payloads associated with the plurality of types of error correction, wherein the calculation uses the signal to noise ratio and coding gains associated with the plurality of types of error correction; and selecting the error correction from among the plurality of types of error correction that provides the greatest payload.

16. A method of determining a payload for a block coded error correction configuration, the method comprising:

performing one or more of the following operations:

calculating a capacity of a digital communication channel based upon reference signal-to-noise ratio values and based upon measured signal-to-noise ratio values;

calculating a difference between reference signal-to-noise ratio values and target reference signal-to-noise ratio values; and determining a redundancy value that provides a coding gain that exceeds a difference between reference signal-to-noise ratio values and target reference signal-to-noise ratio values; and determining the payload after performing the operation.

17. The method of claim 16 wherein the block coded error correction configuration is a Reed-Solomon error correction configuration.

* * * * *